United States Patent Office 3,654,248
Patented Apr. 4, 1972

3,654,248
PROCESS FOR THE PREPARATION OF VINYL CHLORIDE POLYMERS FOR PASTE
Eiichi Iida, Tokyo, Tsuneo Komatsubara, Sadao Ueno, and Soichiro Takeuchi, Takaoka-shi, Etuo Matui, Tokyo, and Toshio Sano, Kawasaki-shi, Japan, assignors to The Japanese Geon Company, Ltd., Tokyo, Japan
No Drawing. Filed July 27, 1970, Ser. No. 58,664
Claims priority, application Japan, July 31, 1969, 44/60,283
Int. Cl. C08f *1/13, 3/30*
U.S. Cl. 260—87.5                                17 Claims

ABSTRACT OF THE DISCLOSURE

A process for the preparation of a vinyl chloride polymer for paste resin, which comprises dispersing in water a vinyl chloride monomer alone or a mixture of vinyl chloride with other monomer or monomers which are copolymerizable therewith, together with at least one oil-soluble catalyst selected from the group consisting of diacyl peroxides, azo compounds, peroxy esters of organic acids and acetylcyclohexylsulfonyl peroxide, and an anionic surfactant of alkylarylsulfonate type, subjecting the resulting dispersion to a homogenization treatment, and thereafter polymerizing the same, acid polymerization being carried out in the presence of at least one halogenated hydro-carbon having not less than 8 carbon atoms and a halogen content of 20–70% by weight.

---

This invention relates to a process for the preparation of vinyl chloride polymers suitable to be used for the preparation of paste dispersion, by polymerizing vinyl chloride monomer or monomeric mixture containing vinyl chloride as main component.

Common practice in the preparation of vinyl chloride polymers for paste resin (hereinafter referred to simply as PVC for paste) is to form fine particulate polymers employing emulsifiers. In such practice, however, occasionally large amount of polymer lumps or agglomerates (hereinafter referred to simply as agglomerate) adhere to inner walls of the polymerization vessel and agitating blades during the polymerization, or such agglomerate is formed in the polymer dispersion. The agglomerates not only reduces the polymer yield resulting in economical loss, but also impairs the cooling ability of the polymerization vessel. Furthermore, considerable labor and time are consumed to remove the adhered agglomerate, which reduces the wording efficiency of the vessel. The agglomerates may also objectionably affect the properties of the product polymer. Therefore, any satisfactory method for making PVC for paste should be able to avoid the formation of such agglomerate.

PVC for paste is required to have the following important properties. Namely, it is required that the polymer particles can be dispersed into unit particles at low shearing rate within short time, when the PVC is blended with plasticizer, diluent, stabilizer, filler, etc. to be formed into paste dispersion (e.g., plastisol, organosol, etc.); that the paste dispersion should exhibit excellent flowability and moldability under the widely varied shearing conditions given during the processing of said dispersion, such as those low shearing forces exerted in slashing, rotation, immersion, casting, sponge shaping, etc., to high shearing forces of spreading, spray coating, etc.; that the dispersion should exhibit sufficient flowability even with minor plasticizer and diluent contents; and that its change in viscosity with passing of time should be little. Furthermore, the PVC for paste must possess high heat stability and transparency.

One of the objects of the present invention is to provide a novel PVC for paste which fully meets the foregoing requirements.

PVC for paste is also required to have an average particle size of 0.2–5µ, preferably 0.2–3µ in diameter, that the particle size distribution should be continuous and cover a wide range, forming a suitable polydisperse system, and that the particle surfaces should possess appropriate affinity with the plasticizer. Conventionally practiced methods of preparation of PVC for paste include, for example, (a) seed polymerization, (b) emulsion polymerization with later addition of emulsifier, (c) emulsion polymerization using special additives, and (d) a method comprising dispersing the monomer in water containing a dispersant, subjecting the dispersion to a homogenization treatment by mechanical high shearing force, and polymerizing the homogenized dispersion in the presence of an oil-soluble catalyst (hereinafter the method will be referred to as homogenized dispersion polymerization).

In seed polymerization (a), vinyl chloride monomer is polymerized in the presence of the polymer prepared in advance. This method is proposed as a remedy of ordinary emulsion polymerization in which the product polymer has too small average particle size such as below 0.2, or contains such too fine size particles at a high ratio, and therefore is unsuitable as the paste resin. In the method (b), the polymerization is initiated without any emulsifying agent (or in the presence of only minor amount of emulsifier), and an emulsifier is added to the system intermittently, while the polymerization is under progress. However, the operation of this method (b), as well as of method (a), are extremely complex. Furthermore, control and reproducibility of the polymerization reaction are difficult in those methods, and initial viscosity of paste dispersion is high. The viscosity also remarkably increases with passing of time. Thus both methods are deficient for the preparation of PVC for paste. In the method (c), special additives are added to otherwise ordinary emulsion polymerization system employing water-soluble catalyst. Methods of this type include, for example, that adding fat and oil, higher fatty acid, esters thereof, or glyceride; that adding dioctyl phthalate (DOP) and lanolin before the polymerization; that adding non-ionic surfactant to the latex after termination of polymerization reaction; that adding higher alcohols; that adding aromatic or aliphatic or hydrocarbon before or during the polymerization; that adding polybasic organic acid; that adding liquid paraffin before polymerization; and that adding alkynediol or alkenediol. However, all of those methods are unsatisfactory for the preparation of PVC for paste in certain respects, such as instability of latex, difficult polymerization control, low heat stability or transparency, or objectionably high viscosity of paste dispersion. The method (d) can produce polymer of average particle size ranging 0.2–3µ with ease, high efficiency, and economic advantage, by homogenization treatment of monomeric dispersion with mechanical high shearing force, preceding the polymerization using an oil-soluble catalyst. Thus the last homogenized dispersion polymerization is entirely different from the first three methods in that the catalyst employed is oil-soluble, and that the monomeric droplets' particle sizes are controlled in advance of the polymerization by homogenization treatment. However, this last method neither is entirely satisfactory.

In the preparation of PVC for paste by the homogenized dispersion polymerization, conventionally the catalyst is optionally selected from many known oil-soluble catalysts which are soluble in monomer. Also the emulsifier is optionally selected from known substances, such as anion surfactants such as alkylsulfonates, alkylarylsulfonates, sulfated alcohol, fatty acid salts, etc., cation surfactants such as cetylpyridinium chloride, cetyltrimethylammonium bromide, etc., or non-ion surfactants such as polyoxyethylene alkyl ether, etc. However, since satisfactory results cannot be obtained with the use of such known agents, many attempts to improve the method have been proposed.

When specific compound, i.e., peroxy dicarbonate in which each carbonate radical contains at least 5 carbon atoms, is used as the oil-soluble catalyst in the homogenized dispersion polymerization, a large amount of agglomerate is formed. As an attempt to reduce the agglomerate formation to the degree about the same to that in the case using lauroyl peroxide as the catalyst, an improved method is proposed wherein at least one long chain compound selected from the group consisting of (a) peroxides such as lauroyl peroxide, (b) ethers such as dicetyl ether or alcohols such as lauryl alcohol, (c) hydrocarbons or halogenated hydrocarbons of at least 8 carbons, (d) esters such as undecyl laurate, ketones such as methyl heptadecyl ketone, and (e) esters of organic dibasic acids such as dioctyl phthalate, is added to the polymerization system. However, the proposed method cannot completely prevent the formation of large amounts of agglomerate, and is furthermore deficient in that the viscosity of paste dispersion is high, which remarkably increases as time passes. The resulting PVC is inferior in heat stability and transparency, and therefore is commercially of less value as PVC for paste (cf. British Pat. No. 1,102,980, and later given examples).

Accordingly, another object of the present invention is to provide an improved homogenized dispersion polymerization which is capable of producing vinyl chloride polymer latex of excellent dispersion stability, forming substantially no agglomerate during polymerization.

Other objects and advantages of the invention will become apparent from reading the following descriptions.

Those objects of the invention can be accomplished by the preparation of polyvinyl chloride by the homogenized dispersion polymerization which is performed in the presence of specific catalyst, specific emulsifier, and specific compound (additive), as later described. The characteristics of the invention reside in such combination of specifically selected polymerization conditions. The object of the invention cannot be achieved if even one of the conditions is not met.

Thus, the invention provides a novel process which comprises dispersing in water vinyl chloride or a mixture of vinyl chloride with other monomer or monomers which are copolymerizable therewith, together with at least one oil-soluble catalyst selected from the group consisting of diacyl peroxides, azo compounds, peroxy esters of organic acids and acetylcyclohexylsulfonyl peroxide, and an anionic surfactant of alkylarylsulfonate type, subjecting the resulting dispersion to a homogenization treatment, and thereafter polymerizing the same, the said polymerization being carried out in the presence of at least one halogenated hydrocarbon having no less than 8 carbon atoms and a halogen content of 20–70% by weight.

The paste dispersion prepared from such PVC for paste produced according to the invention exhibits very low viscosity heretofore never achieved, and furthermore shows excellent viscosity characteristics that the low viscosity is retained even when the blended amount of plasticizer and diluent are reduced (cf. Table 1 given in later appearing Example 1). Consequently, with the paste dispersion provided by this invention it became possible to reduce the thickness of molded products therefrom, not speaking of the remarkable improvement in operational efficiency, because the dispersion possesses low viscosity and excellent flowability. This results in marked reduction in production cost. Also it becomes possible to precisely form molded products of fine and complex configuration. In order to meet the recently increasing demand for molded articles of higher hardness, furthermore, it is necessary to use a paste dispersion of sufficiently low viscosity, with reduced plasticizer and diluent contents. The PVC for paste provided by this invention can fully meet such requirement.

In this subject invention, at least one oil-soluble catalyst selected from the group consisting of (i) diacyl peroxides, (ii) azo compounds, (iii) peroxy esters of organic acids, and (iv) acetylcyclohexylsulfonyl peroxide, must be used. Useful diacyl peroxides of (i) include all of the catalysts known as diacyl peroxide catalysts, such as aromatic diacyl peroxides, for example, benzoyl, p-chlorobenzoyl, and 2,4-dichlorobenzoyl peroxides, and aliphatic diacyl peroxides containing alkyl radicals of 5–17 carbon atoms, for example, caproyl and lauroyl peroxides. Also the azo compounds (ii) include all known azo compound catalysts such as 2,2'-azobisisobutyronitrile, 2,2' - azobis - 2-methylbutyronitrile, 2,2'-azobis-2-methylheptonitrile, and 2,2'-azobisdimethylvaleronitrile, etc. The peroxy esters of organic acids of (iii) include all known peroxy ester catalyst, such as t-butylperoxy pivalate, t-butylperoxy isobutyrate, t-butylperoxy laurate, t-butylperoxy octanoate, etc. Incidentally, peroxydicarbonate catalysts are not included within the catalysts of types (i) and (iii) specified in the present invention. The suitable amount of catalyst normally ranges 0.001–5.0 parts by weight per 100 parts by weight of the monomer charged, while the optimum amount can be easily determined by preliminary experiments, depending on the type of catalyst employed, reaction conditions, etc.

The emulsifier to be employed in this invention must be an anion surfactant of alkylarylsulfonate type. Therefore, other types of anion surfactants, for example, higher fatty acid salts, higher alkylsulfonates, higher alcohol sulfates, fail to achieve the intended effect of the invention. The alkylarylsulfonates employed in the invention include known surfactants of the specified type, for example, those described in A. M. Schwartz and J. W. Perry, Surface Active Agents. As the alkylarylarylsulfonates, metallic salts, particularly alkali metal salts are preferred. For example, sodium alkylbenzenesulfonate, sodium alkylphenolsulfonate, and sodium alkylnaphthalenesulfonate, in which the alkyl radical has 8–18 carbon atoms, preferably 10–14 carbon atoms, may be named, among which particularly sodium alkylbenzenesulfonate being preferred. Those surfactants may be either of so-called hard type or soft type. In certain cases it is permissible to use concurrently with the alkylarylsulfonate, non-ion surfactant or other types of anion surfactant, cation surfactant, or dispersing agent such as polyvinyl alcohol, gelatin, etc., in an amount as will not impair the effect of the invention. The suitable amount of alkylarylsulfonate normally ranges 0.05–5.0 parts by weight per 100 parts by weight of the charged monomer, preferably 0.2–4.0 parts by weight.

The additive to be employed in the subject process must be halogenated hydrocarbon having halogen content of 20–70% by weight, preferably 30–26% by weight, of halogen, and not less than 8 carbon atoms, preferably 8–24, inter alia, 10–24 carbons. Halogenated hydrocarbons containing less than 20% by weight or more than 70% by weight of halogen, or less than 8 carbons cannot achieve the conspicuous effect of the subject invention. As the useful halogenated hydrocarbons, for example, halides of aliphatic hydrocarbons of not less than 8 carbon atoms, such as octane, decane, undecane, pentadecane, eicosane, and the like, and halides of aromatic compounds having substituent group such as an aliphatic radical. Mixtures of more than one of such halogenated carbons are also usable in the invention. The most preferred halogenated hydrocarbon for the purpose of this invention is chlorinated paraffin. Chlorinated paraffin not only exhibits excellent effect, but also is conveniently and easily available. Industrially produced and marketed chlorinated paraffin is normally a mixture of chlorinated paraffins of different numbers of carbon atoms, which can be utilized in the invention without any detrimental effect. The required halogen content of the halogenated hydrocarbon ranges 20–70% by weight as already mentioned, the optimum halogen content in individual practice being easily determinable by preliminary experiments, depending on the number of carbon atoms contained in the employed hydrocarbon. The best time for addition of the halogenated hydrocarbon is before initiation of the polymerization, but in certain cases it is permissible to add it during the polymerization. Preferred quantity of the halogenated hydrocarbon is at least 0.05 part by weight, and normally 0.5–5.0 parts by weight, per 100 parts by weight of the charged monomer. When it is less than 0.05 part by weight, the expected result cannot be achieved. Whereas, addition of more than 5.0 parts by weight of the halogenated hydrocarbon results in no appreciable improvement in the effect of this invention, although it is occasionally permissible to use the additive exceeding the said upper limit.

The reason why the subject process achieves the conspicuous effect as described in the foregoing is not clear, but presumably the combined use of specified catalyst, emulsifier and additive results in unexpected synergistic effect, remarkably improving the stability of dispersed polymer particles during polymerization, and rendering the configuration and surfacial state of the polymer particles suitable for paste resin.

As other monomers copolymerizable with vinyl chloride, for example, olefins such as ethylene, propylene, n-butene; vinylesters such as vinyl acetate, vinyl propionate, vinyl laurate, and vinyl stearate; unsaturated acids such as acrylic acid, methacrylic acid, and itaconic acid, and esters thereof; vinyl ethers such as methyl vinyl ether, ethyl vinyl ether, octyl vinyl ether, and lauryl vinyl ether; maleic acid, fumalic acid, anhydrides or esters thereof; aromatic vinyl, and unsaturated nitrile, etc. can be named. Those monomers are used preferably in the quantity of no greater than 50% by weight of the total monomer.

The homogenization treatment of the monomer dispersion performed in advance of the polymerization is normally effected by exerting mechanical shearing force to the dispersion of specified oil-soluble catalyst, monomer, emulsifier and additive, formed in water serving as the dispersing medium. Various known homogenizers can be used for this purpose, for example, colloid mill, vibrational agitator, two-stage high pressure pump, high pressure getting through nozzle or orifices, and those utilizing ultrasonic waves. Controlling of the molecular particle sizes can be effected by varying the shearing force exerted in the homogenization treatment, agitating condition during the polymerization, type of reactor, quantities of emulsifier and additives, etc. Optimum conditions for each run can be easily determined through simple preliminary experiments. In certain cases, the homogenizing treatment may be continued during the polymerization reaction. The oil-soluble catalyst is normally added before commencement of the polymerization reaction, in certain cases during the polymerization either in aliquots or continuously.

During the polymerization, use of solvent, pH-regulating agent, etc. is optional. In order to improve debubbling property of the paste dispersion during the preparation of said dispersion, it is also permissible to carry out the polymerization in the presence of known antifoaming agents, or to add the said antifoaming agent to the latex obtained after the polymerization. As these antifoaming agents, for example, polyorganosiloxane such as polydimethylsiloxane, polymethylphenylsiloxane, or non-ionic surfactant can be named. The suitable amount of antifoaming agent is at least 0.001 part by weight, preferably 0.001–2.0 part by weight, inter alia, 0.005–0.1 part by weight, per 100 parts by weight of the monomer. Whereby PVC for paste which concurrently possesses excellent debubbling property with the aforementioned favorable properties can be obtained.

Normally preferred polymerization reaction temperature ranges 30–80° C. The latex resulting from the polymerization may be used as it is, or recovered as solid polymer through the means known per se, such as salting out, spray drying, etc. depending on the intended use. The molecular weight of the polymer can be freely and suitably controlled, by regulating the reaction temperature or using molecular weight adjusting agent, to meet the object of each run. The PVC for paste obtained in accordance with the invention can be converted into the paste dispersion by the means known per se, which can be suitably blended with known agents such as volume-increasing crude particulate resin, plasticizer, diluent, gelating agent, heat stabilizer, lubricant, filler, viscosity-reducing agent, coloring agent, foaming agent, antifoaming agent, foam stabilizer, and wetting agent, etc., without impairing the effect of this invention.

Hereinafter the invention will be explained with reference to the working examples which are to be understood as in no way limiting the scope of this invention.

In the examples, parts and percentages are by weight unless otherwise specified. Also the chlorinated paraffin employed in the following examples are generally expressed as $C_m Cl(n)$, $m$ standing for the average number of carbon atoms per molecule of chlorinated paraffin, and $n$ standing for the chlorine content by percent of the chlorinated paraffin.

EXAMPLE 1

(A) An autoclave attached with an agitator was charged with 180 parts of distilled water, 0.17 part of lauroyl peroxide, 1.0 part of hard type sodium dodecylbenzenesulfonate (unless otherwise specified, hard type emulsifiers were used in all of the following experiments), and 1.9 parts of chlorinated paraffin $[C_{15}Cl(50)]$, and its inside atmosphere was nitrogen-substituted, followed by introduction of 100 parts of vinyl chloride monomer. Then this mixed dispersion was homogenized with a homogenizer, and reacted until the pressure in the reactor reached 4.0 kg./cm.$^2$ at 50° C. under stirring.

As the result, substantially no agglomerate was formed in the reactor, and vinyl chloride polymer latex of excellent dispersion stability was obtained, the average polymer particle size ranging 0.5–3.0$\mu$.

The latex was spray-dried, and so recovered paste resin was formed into a paste dispersion. The (i) initial viscosity of the dispersion (first day) and change in viscosity with passing of time (after 7 days), (ii) viscosity under high shearing force, (iii) viscosity of its mixture with volume-increasing crude particulate resin, were measured as to the above product and control samples, and also (iv) the transparency and heat stability of the film obtained from the paste dispersion were measured.

The results are given in Table 1, together with the similarly measured results of commercial polyvinyl chlorides for paste resin.

Incidentally, the viscosity was measured as to the paste dispersion formed by blending 100 parts of paste resin with 45 or 60 parts of dioctyl phthalate (DOP), with B-type viscosimeter at 25° C. In the following examples, viscosities were measured in the same manner, the amount of DOP blended being 60 parts unless otherwise specified.

The paste viscosity under high shearing force was measured as to the paste dispersion formed by blending 100 parts of paste resin with 60 parts of DOP, with Severs extrusion rheometer (A–100 type, orifice length: 5.00 cm., orifice diameter: 0.29 cm.), by comparing the extrusion amount under a pressure of 6.3 kg./cm.$^2$.

Viscosity of the mixture of the paste resin with volume-increasing crude particulate resin was measured as to the paste dispersion formed by blending 70 parts of paste resin with 30 parts of volume-increasing crude particulate polyvinyl chloride resin (Geon 103ZX, product of Japanese Geon Company, Ltd.), and 60 parts of DOP.

The transparency of the film obtained by heating a paste dispersion formed of 100 parts of paste resin, 60 parts of DOP, and 2 parts of liquid Cd-Ba-Zn stabilizer, in a 190° C. Gear's oven for 5 minutes (0.85 mm. in thickness) was expressed by percent transmission of light of 600 mμ in wavelength.

Also the heat stability of the same film was expressed by the time passed before the film was blackened under heating in 190° C. Gear's oven.

TABLE 1

(i) Viscosity of paste dispersion (cp.)

|  | DOP (45 parts) first day | DOP (60 parts) | |
|---|---|---|---|
|  |  | First day | Seventh day |
| Sample of the invention | 9,600 | 2,400 | 4,300 |
| Controls: Commercial product— |  |  |  |
| (a) | 300,000 | 6,000 | 18,000 |
| (b) | 20,000 | 4,400 | 10,100 |
| (c) | 100,000 | 4,300 | 6,500 |

(ii) Viscosity under high shearing force (Seyber's extrusion amount), g./100 sec.

Sample of the invention _____ 550
Controls: Commercial product—
    (a) _____ 170
    (b) _____ 410
    (c) _____ 160

(iii) Viscosity of mixture of paste resin with volume-increasing crude particulate resin (cp.)

Sample of the invention _____ 1,800
Control: Commercial product—
    (a) _____ 2,600

(iv) Transparency and heat stability

|  | Transparency (percent) | Heat stability (min.) |
|---|---|---|
| Sample of the invention | 81 | 30 |
| Control: Commercial product—(a) | 66 | 30 |

From the results shown in Table 1, it can be understood that the sample product of the invention has markedly lower initial viscosity compared with those of controls (commercial products), and also shows only minor viscosity change with passing of time. Particularly, even when the amount of plasticizer was reduced (45 parts) the sample of the invention exhibits very low viscosity, and excellent flowability. The favorably low viscosity of the sample product of the invention furthermore is clearly demonstrated by the remarkably greater amount of extrusion under high shearing force, compared with those of controls, and very low viscosity of the mixture with volume-increasing crude particulate resin. Also the film formed of the sample product of the invention exhibits excellent transparency, while substantially retaining the original heat stability.

(B) Polyvinyl chlorides were prepared in the manner described in (A) above, except that in some of the runs anion surfactants other than sodium dodecylbenzenesulfonate were used as the emulsifier as specified in Table 2, and as the additive, specified higher alcohol was used in place of chlorinated paraffin. Thus the significance of type of emulsifier to the preparation of latex and viscosity of paste dispersion was examined. The results are shown in Table 2.

TABLE 2

| Emulsifier | Additive | Viscosity of paste dispersion (cp.) | |
|---|---|---|---|
|  |  | First day | Seventh day |
| Sample of this invention: Sodium dodecylbenzene sulfonate— |  |  |  |
| Hard type | $C_{15}Cl$ (50) | 2,400 | 4,300 |
| Do | $C_{24}Cl$ (40) | 3,300 | 8,100 |
| Soft type | $C_{15}Cl$ (50) | 2,500 | 4,900 |
| Controls: |  |  |  |
| I. Sodium dodecylsulfonate (hard type) | I-1 None | 28,700 | 50,800 |
|  | I-2 Lauryl alcohol | 4,800 | 12,000 |
| II. Sodium lauryl sulfate | II-1 $C_{15}Cl$ (50) | 260,000 |  |
|  | II-2 $C_{24}Cl$ (40) | 44,200 |  |
|  | II-3 Lauryl alcohol | 26,200 | 71,300 |
|  | II-4 Cetyl alcohol | 39,600 |  |
| III. Sodium laurate | III-1 None | 23,500 | 99,600 |
|  | III-2 $C_{15}Cl$ (50) | 618,000 |  |
|  | III-3 Cetyl alcohol | 31,500 | 55,200 |
| IV. Sodium secondary alkyl ($C_{14-18}$) sulfonate | IV-1 $C_{15}Cl$ (50) | 11,900 | 39,500 |
|  | IV-2 $C_{24}Cl$ (40) | 12,500 |  |
|  | IV-3 Lauryl alcohol | 15,400 | 42,200 |
|  | IV-4 Cetyl alcohol | 6,600 | 23,000 |

In the above Table 2, those marked with X are the dispersions of which viscosities on the day were not measured, because their high initial viscosities foretold still higher viscosities on the 7th day.

Preparation of latex

In all runs within the scope of this invention, substantially no agglomerate was formed, and latices of excellent dispersion stability were obtained. Generally favorable latices were obtained also in control runs, but in Control I-1, a large amount of agglomerate was formed, and the latex had instable sedimentation property. In Control II-1, the whole latex became viscous and somewhat creamy. Also a latex of instable sedimentation property was obtained in Control IV-2.

Comparison of viscosities of paste dispersions

It can be understood from the results in Table 2 that the viscosity is remarkably reduced by the addition of sodium dodecylbenzenesulfonate as the emulsifier and chlorinated paraffin as the additive. In contrast, even when chlorinated paraffin was used as the additive, if anion surfactant of the type other than sodium dodecylbenzenesulfonate (anion surfactant of alkylarylsulfonate type) was used as the emulsifier, the viscosity rose even above the case wherein chlorinated paraffin was not added or, if the viscosity was somethat lowered, still it was very much higher than that of the samples of this invention. On the other hand, when emulsifiers other than sodium dodecylbenzenesulfonate was used, generally higher alcohols exhibited better viscosity-reducing effect than that of chlorinated paraffin. Conversely, with sodium dodecylbenzenesulfonate used as the emulsifier, chlorinated paraffin showed better viscosity-reducing effect than that of higher alcohols.

From the foregoing, it can be understood that, in the subject process the use of specific anion surfactant-alkylarylsulfonate as the emulsifier is essential.

EXAMPLE 2

Vinyl chloride polymers were prepared by the method described in Example 1–(A) from the recipe below, to examine the signfiicance of type of additive to the preparation of latex and viscosity of paste dispersion. The results were as shown in Table 3.

RECIPE

| | Parts |
|---|---|
| Distilled water | 180 |
| Vinyl chloride monomer | 100 |
| Lauroyl peroxide | 0.17 |
| Sodium dodecylbenzenesulfonate | 1.0 |
| Additive (cf. Table 3) | 1.9 |

TABLE 3

| | Viscosity of paste dispersion (cp.) | |
|---|---|---|
| Additive | First day | Seventh day |
| Samples of this invention: | | |
| $C_{15}Cl$ (50) | 2,400 | 4,500 |
| $C_{24}Cl$ (40) | 3,300 | 8,100 |
| Controls: | | |
| I-1 None | 28,700 | 50,800 |
| I-2 Lauryl alcohol | 4,800 | 12,000 |
| I-3 1-octadecanol | 4,500 | 10,000 |
| I-4 Cholesterol | 126,000 | 264,000 |
| I-5 Dicetyl ether | 8,200 | 24,300 |
| I-6 n-Paraffin [1] | 6,500 | 16,300 |
| I-7 Methyl-n-heptadecylketone | 6,100 | 33,400 |
| I-8 Undecyl laurate | 4,700 | 10,800 |
| I-9 Dioctyl phthalate | | |
| I-10 Stearic acid | 5,000 | 14,400 |
| I-11 1,6-dichloro-n-hexane | 4,500 | 19,700 |
| I-12 n-Butyl chloride | 5,940 | 39,500 |
| I-13 1,2,3-trichloropropane | 4,880 | 23,700 |

[1] n-Paraffin composed chiefly of paraffins of 15–16 carbon atoms.

Preparation of latex

In both runs within the scope of this invention, substantially no agglomerate was formed, and latices of excellent dispersion stability were obtained. In Control I–1, a large amount of agglomerate was formed, and the latex had instable sedimentation property. The minor amount of agglomerate was formed in Control I–3. In Control I–4, the latex became viscous and creamy, and much aggregate was formed. Also a large amount of agglomerate was formed in Control I–9, and the latex was sedimenting and could not be spray-dried. Therefore, viscosity could not be measured with that sample. In Control I–10, the latex was slightly viscous and creamy.

Comparison of viscosities of paste dispersions

The results given in Table 3 clearly demonstate that the viscosities of paste dispersions were markedly low only when chlorinated paraffin specified in this invention was used as the additive, and their changes with passing of time were minor.

From the above results, it can be understood that in the subject process the use of specified additive (halogenated hydrocarbon) is essential.

EXAMPLE 3

Vinyl chloride polymers were obtained by the method described in Example 1–(A), from the recipe below, to examine the significance of catalyst, with the results as given in Table 4.

RECIPE

| | Parts |
|---|---|
| Distilled water | 180 |
| Vinyl chloride monomer | 100 |
| Catalyst (cf. Table 4) | Various |
| Sodium dodecylbenzenesulfonate | 1.0 |
| Chlorinated paraffin [$C_{15}Cl$(50)] | 1.9 |

TABLE 4

| Catalyst (part) | Amount of agglomerate formed [1] (percent) | Viscosity of paste dispersion (cp.) | |
|---|---|---|---|
| | | First day | Seventh day |
| Sample of this invention: | | | |
| Lauroyl peroxide (0.17) | 0.3 | 2,400 | 4,500 |
| 2,4-dichlorobenzoyl peroxide (0.058) | 0.5 | 2,700 | 5,600 |
| 2,2'-asobisdimethyl valeronitrile (0.025) | 1.5 | 2,800 | 6,60 |
| 5-butyl-peroxyisobutyrate (0.45) | 0.6 | 2,700 | 5,70 |
| Lauroyl peroxide (0.08) plus 2,4-dichlorobenzoyl peroxide (0.03) | 0.4 | 2,600 | 5,400 |
| Lauroyl peroxide (0.08) plus 2,2'-azobisdimethyl-valeronitrile (0.013) | 1.2 | 2,600 | 6,300 |
| Lauroyl peroxide (0.08) plus t-butylperoxy pivalate (0.02) | 0.7 | 2,000 | 3,700 |
| Lauroyl peroxide (0.08) plus acetylcyclohexylsulfonyl peroxide (0.012) | 0.8 | 2,500 | 5,100 |
| Controls: | | | |
| Diethylhexyl peroxydicarbonate (0.035) | 5.0 | 3,400 | 6,500 |
| Diisopropyl peroxydicarbonate (0.025) | 5.7 | 4,600 | 13,500 |

[1] The amount of the agglomerate was determined as follows: the wet agglomerate was dried, measured of the weight, and the weight ratio to the charged monomer was calculated,

Preparation of latex

As is clear from Table 4, when catalysts outside the scope of this invention were used, as much as 5.0% and above of agglomerate was formed. In contrast thereto, according to the subject process either substantially no agglomerate was formed (less than 1%) or, if formed, never exceeded 1.5%. Thus the formation of agglomerate was very minor in the samples of this invention.

Also while the control latices were creamy, the latices of the invention exhibited excellent dispersion stability.

Comparison of viscosities of paste dispersions

In accordance with the present invention, very low viscosity paste dispersion was obtained such as 2,000 cp. (first day) at the highest. In contrast thereto, the control samples had very high viscosities.

Those results substantiate that the use of specified oil-soluble catalyst is essential for the process of this invention.

EXAMPLE 4

Vinyl chloride polymers were prepared in accordance with the method described in Example 1–(A), from the recipe given below. In all runs, no substantial formation of agglomerate was observed, and all the resulting latices exhibited excellent dispersion stability. The viscosities of the paste dispersions formed from the so obtained PVC samples are shown in Table 5 below.

RECIPE

| | Parts |
|---|---|
| Distilled water | 180 |
| Vinyl chloride monomer | 100 |
| Lauroyl peroxide | 0.17 |
| Sodium dodecylbenzenesulfonate | 1.0 |
| Chlorinated paraffin (cf. Table 5) | 1.9 |

TABLE 5

| Chlorinated paraffin | Viscosity of paste dispersion (cp.) | |
|---|---|---|
| | First day | Seventh day |
| $C_8Cl$ (24) | 3,200 | 6,200 |
| $C_{11}Cl$ (20) | 3,500 | 7,000 |
| $C_{11}Cl$ (20) | 3,300 | 5,500 |
| $C_{11}Cl$ (20) | 2,800 | 5,500 |
| $C_{11}Cl$ (65) | 3,100 | 9,900 |
| $C_{15}Cl$ (40) | 2,700 | 7,500 |
| $C_{15}Cl$ (50) | 2,400 | 4,500 |
| $C_{15}Cl$ (55) | 3,000 | 5,600 |
| $C_{24}Cl$ (40) | 3,300 | 8,100 |
| $C_{24}Cl$ (45) | 3,400 | 4,600 |

EXAMPLE 5

A vinyl chloride polymer was prepared in the manner described in Example 1–(A), except that the 100 parts of vinyl chloride monomer was replaced by a mixture of 95 parts of vinyl chloride monomer and 5 parts of vinyl acetate monomer. As the result, latex of excellent dispersion stability was obtained, with no substantial formation of agglomerate. The viscosity (first day) of of the paste dispersion was 2,600 cp.

EXAMPLE 6

A vinyl chloride polymer was prepared in the manner described in Example 1–(A), except that 0.03 part of polyoxymethylsiloxane (1,000 cs./30° C.) was further added to the system. The polymer exhibited excellent debubbling property when formed into a paste dispersion. The viscosity (first day) of the paste dispersion was 2,400 cp.

We claim:

1. A process for the preparation of a vinyl chloride polymer for paste resin, which comprises dispersing in water a vinyl chloride monomer alone or a mixture of vinyl chloride with other monomer or monomers which are copolymerizable therewith, together with at least one oil-soluble catalyst selected from the group consisting of diacyl peroxides, azo compounds, peroxy esters of organic acids and acetylcyclohexylsulfonyl peroxide, and an anionic surfactant of the alkylarylsulfonate type, subjecting the resulting dispersion to a homogenization treatment, and thereafter polymerizing the same, said polymerization being carried out in the presence of at least one halognated hydro-carbon having not less than 8 carbon atoms and a halogen content of 20–70% by weight.

2. A process for the preparation of a vinyl chloride polymer for paste resin, which comprises dispersing in water a vinyl chloride monomer alone or a mixture of vinyl chloride with other monomer or monomers which are copolymerizable therewith, together with at least one oil-soluble catalyst selected from the group consisting of diacyl peroxides, azo compounds, peroxy esters of organic acids and acetylcyclohexylsulfonyl peroxide, and an anionic surfactant of the alkylarylsulfonate type, subjecting the resulting dispersion to a homogenization treatment, and thereafter polymerizing the same, the polymerization being carried out in the presence of an antifoaming agent and at least one halogenated hydrocarbon having at least 8 carbon atoms and a halogen content of 20–70% by weight.

3. A process for the preparation of a vinyl chloride polymer for paste resin, which comprises dispersing in water a vinyl chloride monomer alone or a mixture of vinyl chloride with other monomer or monomers which are copolymerizable therewith, together with at least one oil-soluble catalyst selected from the group consisting of diacyl peroxides, azo compounds, peroxy esters of organic acids and acetylcyclohexylsulfonyl peroxide, and an anionic surfactant of the alkylarylsulfonate type, subjecting the resulting dispersion to a homogenization treatment, thereafter polymerizing the same, said polymerization being carried out in the presence of at least one halogenated hydrocarbon having at least 8 carbon atoms and a halogen content of 20–70% by weight, and adding an antifoaming agent to the latex thus obtained.

4. The process of claim 1, in which 0.001–5.0 parts by weight of said oil-soluble catalyst per 100 parts by weight of the monomer is used.

5. The process of claim 1, in which 0.05–5.0 parts by weight of said anion surfactant of alkylarylsulfonate type parts by weight of the monomer is used.

6. The process of claim 1, wherein at least 0.05 part by weight of said halogenated hydrocarbon per 100 parts by weight of the monomer is used.

7. The process of claim 2, wherein at least 0.001 part by weight of said antifoaming agent per 100 parts by weight of the monomer is used.

8. The process of claim 3, wherein at least 0.001 part by weight of said antifoaming agent per 100 parts by weight of the monomer is added.

9. The process of claim 1, in which said anionic surfactant of the alkylarylsulfonate type is an alkali metal alkylbenzenesulfonate having 8–18 carbon atoms in its alkyl radical and said halogenated hydrocarbon is a chlorinated aliphatic hydrocarbon having 8–24 carbon atoms and a chlorine content of 20–70% by weight.

10. The process of claim 2, in which 0.001–5.0 parts by weight of said oil-soluble catalyst per 100 parts by weight of the monomer is used.

11. The process of claim 3, in which 0.001–5.0 parts by weight of said oil-soluble catalyst per 100 parts by weight of the monomer is used.

12. The process of claim 2, in which 0.05–5.0 parts by weight of said anion surfactant of alkylarylsulfonate type parts by weight of the monomer is used.

13. The process of claim 3, in which 0.05–5.0 parts by weight of said anion surfactant of alkylarylsulfonate type parts by weight of the monomer is used.

14. The process of claim 2, wherein at least 0.05 part by weight of said halogenated hydrocarbon per 100 parts by weight of the monomer is used.

15. The process of claim 3, wherein at least 0.05 part by weight of said halogenated hydrocarbon per 100 parts by weight of the monomer is used.

16. The process of claim 2, in which said anionic surfactant of the alkylarylsulfonate type is an alkali metal alkylbenzenesulfonate having 8–18 carbon atoms in its alkyl radical and said halogenated hydrocarbon is a chlorinated aliphatic hydrocarbon having 8–24 carbon atoms and a chlorine content of 20–70% by weight.

17. The process of claim 3, in which said anionic surfactant of the alkylarylsulfonate type is an alkali metal alkylbenzenesulfonate having 8–18 carbon atoms in its alkyl radical and said halogenated hydrocarbon is a chlorinated aliphatic hydrocarbon having 8–24 carbon atoms and a chlorine content of 20–70% by weight.

References Cited

UNITED STATES PATENTS

| 2,674,593 | 4/1954 | Condo et al. | 260—92.8 W |
|---|---|---|---|
| 2,890,211 | 6/1959 | Lintala | 260—92.8 W |
| 3,324,097 | 6/1967 | Pears | 260—92.8 W |

JOSEPH L. SCHOFER, Primary Examiner

J. A. DONAHUE, Jr., Assistant Examiner

U.S. Cl. X.R.

260—85.5 XA, 87.5 C, 87.5 G, 86.1 R, 87.1, 92.8 W, 78 CL